Oct. 27, 1970   C. K. JONES ET AL   3,536,602
GLOW INHIBITING METHOD FOR GLOW DISCHARGE APPARATUS
Filed Jan. 27, 1967   2 Sheets-Sheet 1
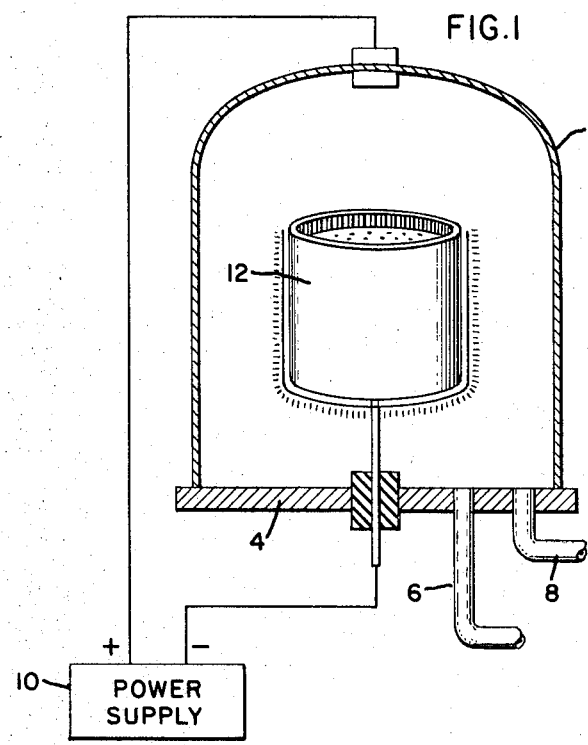
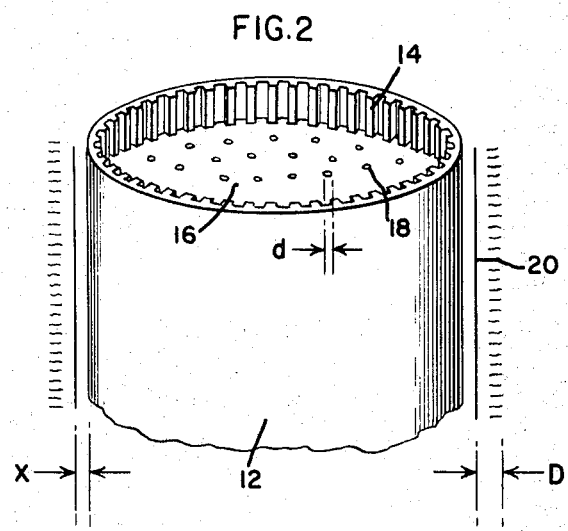
INVENTORS:
CLAUDE K. JONES,
STUART W. MARTIN,
BY Robert J. Bird
THEIR ATTORNEY.

INVENTORS:
CLAUDE K. JONES,
STUART W. MARTIN,

BY Robert J Bird

THEIR ATTORNEY.

United States Patent Office 3,536,602
Patented Oct. 27, 1970

3,536,602
GLOW INHIBITING METHOD FOR GLOW DISCHARGE APPARATUS
Claude K. Jones, Marblehead, and Stuart W. Martin, Salem, Mass., assignors to General Electric Company, a corporation of New York
Filed Jan. 27, 1967, Ser. No. 612,228
Int. Cl. B01k 1/00
U.S. Cl. 204—164                           3 Claims

ABSTRACT OF THE DISCLOSURE

Glow discharge mask to selectively intercept ion bombardment of a cathode workpiece limiting, to that extent, ionitriding of the workpiece.

BACKGROUND OF THE INVENTION

Figure 3:
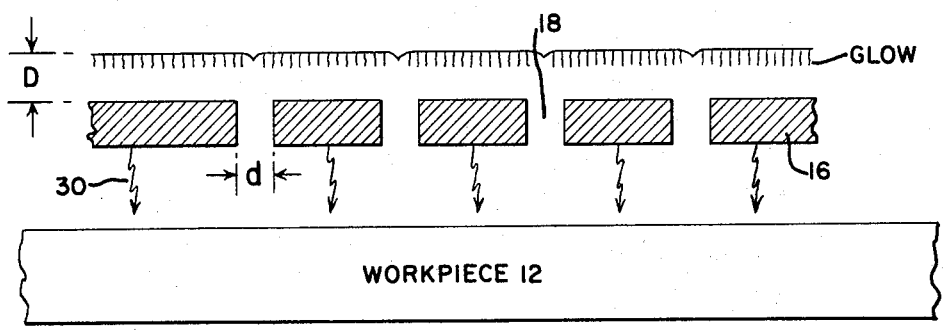

This invention relates to a method for ion nitriding (or "ionitriding" as it is known in the art) or otherwise treating metal workpieces in a glow discharge environment. More particularly, the present invention is related to a mechanical masking or inhibitor to prevent glow discharge from penetrating certain undesirable areas of a workpiece.

Generally, a glow discharge apparatus, such as is used for ionitriding, comprises a vacuum chamber in which is mounted a workpiece which is insulated from the chamber. The chamber is evacuated by means of a vacuum pump, and then charged to a predetermined pressure level, on the order of 1 mm. of mercury, with a suitable gas, depending on the operation to be performed. A source of current is connected such that the vacuum chamber or container serves as the anode and the workpiece as the cathode. When voltage is applied and gradually increased, the rarified gaseous atmosphere becomes ionized. Concurrently, at some voltage level, depending on the degree of vacuum and the distance between anode and cathode, a current or discharge is produced through the atmosphere which produces a glow in the gas atmosphere. This glow discharge, if uninhibited, spreads uniformly over all exposed surfaces of a workpiece cathode.

One use for such an apparatus is in the process of ionitriding. For this process, the atmosphere within the vacuum chamber is typically charged with nitrogen, and the ionized nitrogen is accelerated into and bombards the surface of a workpiece cathode, heating it up and imparting a nitrided "case" to it. In some workpieces, it is desirable to restrict the nitrided surface to particular areas where case hardening is desired and to prevent the nitriding process from taking place in other areas of the workpiece. Since the ion bombardment occurs uniformly on the surface of a workpiece whenever the glow discharge is present, and since the glow discharge is present uniformly over the workpiece surface wherever it is exposed, it is therefore necessary, in order to selectrively prevent nitriding, to establish a method to selectively inhibit the presence of the glow discharge on the surface of a workpiece.

Accordingly, it is an object of the present invention to provide a method to selectively inhibit the glow penetration about a workpiece in a glow discharge apparatus.

Another object of the present invention is to provide a method to mask a workpiece in a glow discharge apparatus to selectively expose areas thereof to a glow discharge.

Other objects, advantages and features of the present invention will become apparent from the following description of one embodiment thereof, when taken in connection with the accompanying drawing.

SUMMARY OF THE INVENTION

Briefly stated, the present invention is practiced in one form by a glow discharge inhibitor or mask which includes a shield which is impervious to penetration by the glow, but which allows evacuation or communication of the atmosphere therethrough. The inhibitor may be a sheet with a hole, or holes, therethrough, having diameters less than the depth of the glow; or it may be a plate which is spaced from the workpiece by a clearance less than the glow depth. The glow is unable to penetrate to the interior of the inhibitor because, due to the electrical and pressure characteristics within the system, the glow occurs at a distance from the inhibiter greater than the diameter of the holes or the width of the clearance.

DRAWING

Figure 4:
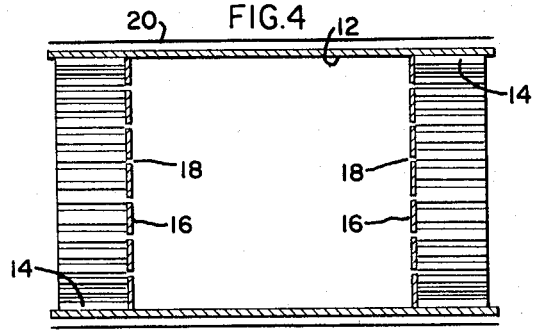
Figure 5:
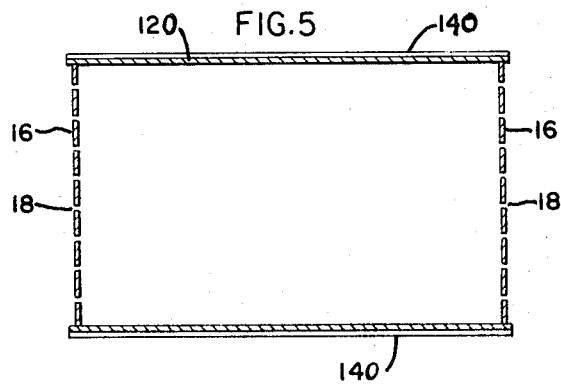

In the drawing:
FIG. 1 is a simplified elevation view, partly in section, of a typical glow discharge apparatus.
FIG. 2 is an enlarged view of a typical workpiece in conjunction with the glow inhibitor of the present invention.
FIG. 3 is a cross section of the glow inhibitor of the present invention illustrating its principle of operation.
FIGS. 4 and 5 are sectional views further illustrative of the application of the present invention.

DESCRIPTION OF THE PREFERRED EMBODIMENT

Referring now to FIG. 1, a glow discharge apparatus is shown generally including a vacuum container 2 supported on a supporting base 4. An evacuation line 6 extends from the interior of the vacuum container 2 to a vacuum pump not shown. A charging conduit 8 extends from the interior of the vacuum container 2 to a source of charging gas as, for example, nitrogen, not shown. A source of electric current 10 is connected at its positive terminal to the vacuum container 2 such that the vacuum container including the supporting base are at the same potential as the positive terminal and serve as the anode of the present glow discharge system. Within the vacuum container 2, a workpiece 12 is suitably supported so as to be insulated from the anode 2 and is electrically connected to the negative terminal of the power supply 10 so as to serve as the cathode of the present system.

The foregoing is descriptive of the background of the present invention. In operation, the vacuum container 2 is evacuated through evacuation line 6 and then charged through charging conduit 8 with a suitable atmosphere as, for example, nitrogen if a nitriding process is to be performed, and to a suitable pressure as, for example, 1 mm. of mercury. DC voltage is applied from its source 10 and gradually increased until the atmosphere within vacuum container 2 is ionized and a discharge therethrough produces a glow. Suitable adjustments of voltage and pressure will result in a change in the position and thickness of the glow relative to the workpiece cathode. That is, increased chamber pressure will result in a narrowing of the glow depth relative to the workpiece. Voltage increase to a certain range results in a stable glow discharge. Beyond this voltage range the glow deteriorates into an arc. Generally, the glow appears adjacent the skin of the cathode or workpiece. Moreover, it covers every exposed area of the cathode.

It is sometimes desirable to nitride a part of a workpiece without nitriding other parts thereof. For purposes of illustrating the present invention, consider a cylindrical distance piece having internal gear teeth and forming a coupling member. The internal gear teeth are located only at the end portions of the cylinder. In nitriding such a member, it is desirable to nitride only the gear teeth and not the exterior or the central part of the interior of the member.

Referring now to FIG. 2, a workpiece as above described, is shown at 12. Internal gear teeth 14 are shown at one end thereof. Within the cylindrical member 12 and segregating the tooth area 14 from the central interior area, is a glow inhibitor or mask 16 which is, electrically, a part of the cathode. Mask 16 has a plurality of holes 18 formed therethrough, each having a diameter $d$. The number of holes 18 is not material to the present invention. Similarly, a glow inhibitor or shield 20 surrounds the exterior of cylindrical workpiece 12 at a distance $x$ therefrom. In operation, when the voltage is applied and the glow appears, the mask or inhibitor 16 prevents the glow from entering into the central part of cylinder or workpiece 12. Similarly, the glow shield 20 prevents the flow from reaching the exterior surface of workpiece 12. Though the shield has a clearance $x$ between itself and the workpiece 12, and though the mask 16 has holes 18 therethrough having a diameter $d$, the glow will not penetrate these clearances or holes. By adjustments of the pressure within the vacuum jar, the glow is made to have a certain thickness D from the surface of a cathode member to the exterior of the glow. As long as the dimension $x$ and the diameter $d$ remain smaller than the glow thickness D, the glow will not penetrate the clearance $x$ or the diameters $d$. This is shown, in the case of the mask 16, in FIG. 3. In practice, the glow thickness D is not well defined and holes $d$ or clearance $x$ need not be greater than dimensions on the order of 3/16 inch to permit effective evacuation. So as a practical matter, D is many times larger than $d$ or $x$. However, as a limit, $d$ and $x$ must be kept smaller than D. Values of D are on the order of 1 inch.

At this point, it should be explained that for purposes of controlled nitriding, it would be possible to have a solid glow mask or inhibitor 16 with no holes, and also to have a glow shield such as 20 with no clearance between itself and the workpiece. The problems that arise from the use of such solid glow shields are as follows. First, in evacuating the system, gas traps may result. Second, due to this possible pressure difference within the vacuum chamber, uneven heating of the workpiece may result from convection and cause distortion thereof. The holes in the shields permit uniform vacuum pressure so that there is no appreciable convection. This results in uniform heating of the system so that there are no distortions in a workpiece as a result of the treatment. Heating in nonglow areas results from radiation from the shield. This is illustrated by arrows 30 in FIG. 3.

Glow inhibitors of the mask or shield type as above described can be used in most any configuration depending upon the shape of the workpiece.

FIG. 4 shows how shield members 16 prevent ionitriding within most of the interior of workpiece 12. Shield 20 further prevents the outside from being nitrided leaving only internal gear teeth 14 exposed to the glow. This is the same arrangement as shown in FIG. 2.

FIG. 5 shows a cylindrical external gear member 120 having teeth 140. In this case it is desired to ionitride the external teeth and to shield the interior surface. Shield 16 with its holes 18 covers the ends of cylindrical workpiece 12 to permit this selective nitriding.

It will be apparent that a glow mask or inhibitor has herein been described which permits selective ionitriding in a glow discharge apparatus while at the same time permitting free communication of the atmosphere within the vacuum jar. The shield and the workpiece can take many forms, the foregoing being given by way of example only. It may occur to others of ordinary skill in the art to make modifications of the invention which will remain within the concept and scope thereof. Accordingly, it is intended that the invention be not limited by the details in which it has been described but that it encompass all within the purview of the following claims.

What is claimed is:

1. The method of selectively ionitriding a workpiece including the steps of:
    connecting said workpiece as the cathode in a vacuum container, anode charged with a nitrogenous atmosphere,
    placing a gas-pervious discharge shield in electrical connection with said workpiece and in juxtaposition to a selected area of said workpiece, so that the distance from said workpiece to said shield is less than the distance between said shield and the exterior of the glow discharge when it is established, and
    establishing a glow discharge within said container adjacent said cathode and said shield and not penetrating said shield.

2. The method according to claim 1 in which said workpiece is a concave member, which defines with said shield a glow-impervious interior.

3. The method of ionitriding the internal teeth of a gear coupling comprising:
    providing a hollow cylindrical gear coupling having internal teeth in at least one end thereof,
    connecting the coupling as the cathode in a glow discharge chamber having a low pressure nitrogenous atmosphere therein,
    surrounding the exterior of the coupling with a cylindrical mask electrically connected to the cathodic coupling and spaced therefrom by a clearance,
    closing off the interior of the coupling beyond the teeth by a second mask having holes therein no longer than said clearance electrically connected to the cathodic coupling and establishing a glow discharge within the chamber of a glow depth greater than said clearance.

References Cited

UNITED STATES PATENTS

| 3,035,205 | 1962 | Berghaus et al. | 148—16.6 |
| 3,190,772 | 6/1965 | Berghaus et al. | 148—16.6 |
| 2,946,708 | 7/1960 | Berghaus et al. | 148—16.6 |

OTHER REFERENCES

Holland: Vacuum Deposition of Thin Films, 1963, pp. 90–91.

JOHN H. MACK, Primary Examiner

S. S. KANTER, Assistant Examiner

U.S. Cl. X.R.

148—16.6